United States Patent [19]

Przyborski et al.

[11] Patent Number: 5,475,425
[45] Date of Patent: Dec. 12, 1995

[54] APPARATUS AND METHOD FOR CREATING VIDEO OUTPUTS THAT EMULATE THE LOOK OF MOTION PICTURE FILM

[75] Inventors: Glenn B. Przyborski; Robert F. Gibson, both of Pittsburgh; John H. Harn, Coraopolis; Lloyd R. Hucke, III, Library, all of Pa.

[73] Assignees: Przyborski Productions; Keystone Computer Resources Inc., Pittsburgh, Pa.

[21] Appl. No.: 186,733

[22] Filed: Jan. 25, 1994

[51] Int. Cl.[6] .................................................. H04N 5/262
[52] U.S. Cl. ............................................. 348/239; 348/446
[58] Field of Search ..................................... 348/578, 446, 348/239, 578, 446, 448, 322, 321, 239; H04N 5/262

[56] References Cited

U.S. PATENT DOCUMENTS

| | | | |
|---|---|---|---|
| 4,330,796 | 5/1982 | Anagnostopoulos et al. | 348/322 |
| 4,686,574 | 8/1987 | Erhardt | 358/213.26 |
| 4,698,673 | 10/1987 | Johnson | 358/140 |
| 4,730,217 | 3/1988 | Tonge | 358/160 |
| 4,740,842 | 4/1988 | Annegarn | 358/160 |
| 4,742,395 | 5/1988 | Nagai | 358/213.19 |
| 4,771,342 | 9/1988 | Beesley | 348/578 |
| 4,800,435 | 1/1989 | Ikeda | 358/213.19 |
| 4,805,026 | 2/1989 | Oda | 358/213.29 |
| 4,831,453 | 5/1989 | Takemura | 358/213.19 |
| 4,835,615 | 5/1989 | Taniguchi | 358/213.19 |
| 4,839,734 | 6/1989 | Takemura | 358/213.22 |
| 4,935,816 | 6/1990 | Faber | 358/160 |
| 5,012,326 | 4/1991 | Sakamoto et al. | 348/446 |
| 5,027,218 | 6/1991 | Ueda | 358/213.23 |
| 5,051,832 | 9/1991 | Losee | 358/213.29 |
| 5,065,243 | 11/1991 | Katagiri | 348/446 |
| 5,115,311 | 5/1992 | Jaqua | 358/140 |
| 5,140,414 | 8/1992 | Mowry | 348/578 |
| 5,267,863 | 12/1993 | Simmons, Jr. | 434/96 |

OTHER PUBLICATIONS

Ikegama Electronics Specification Sheet.

*Primary Examiner*—James J. Groody
*Assistant Examiner*—Cheryl Cohen
*Attorney, Agent, or Firm*—Dickie, McCamey & Chilcote; Leland P. Schermer

[57] ABSTRACT

Video output emulating the broadcast look of motion picture film is created by the present invention. A video camera for real time simulation of the visual appearance of motion picture film that has been transferred or converted to a video signal comprising analog signal input conditioning circuitry, an analog to digital convertor, timing and control circuitry, an address multiplexer and memory control, a digital adder, and a digital to analog convertor. A method for creating the look of broadcast motion picture film comprising the steps of increasing the scan rate of CCD image sensors to output non-interlaced video images, converting said video images from analog to digital form, writing said video images to memory, adding a selective, adjustable amount of two dimensional, electronic artifacts to simulate film grain, reading said video images from said memory banks to a video output data bus at predetermined rates, and converting said video images from digital to analog form for recording or broadcast.

6 Claims, 11 Drawing Sheets

FIG. 11  Memory Buffer Operations at 30 and 24 frames per second.

TABLE 1 Memory Buffer Operations @ 30 frames per second film simulation

| Output Field # | Field #1 | Field #2 | Field #3 | Field #4 | Field #5 | Field #6 |
|---|---|---|---|---|---|---|
| Memory Bank 1 | read even |  |  | read odd |  |  |
| Memory Bank 2 | write odd | read odd | write even |  | write even | read odd |
| Memory Bank 3 | write even |  | read even |  | write odd |  |

TABLE 2 Memory Buffer Operations @ 24 frames per second film simulation

| Output Field # | Field #1 | Field #2 | Field #3 | Field #4 | Field #5 | Field #6 | Field #7 | Field #8 | Field #9 | Field #10 |
|---|---|---|---|---|---|---|---|---|---|---|
| Memory Bank 1 | read even | read odd |  | write even | read even | write odd |  | read odd |  |  |
| Memory Bank 2 | write odd |  |  | read odd |  | write even | read even |  | write even | read odd |
| Memory Bank 3 | write even |  | read even | write odd |  | read odd |  |  | write odd |  |

APPARATUS AND METHOD FOR CREATING VIDEO OUTPUTS THAT EMULATE THE LOOK OF MOTION PICTURE FILM

BACKGROUND OF THE INVENTION

1. Field of the Invention

The present invention is directed to a video camera and method for simulating the broadcast look of motion picture film. More specifically, the invention provides a video camera design and method for real time digital video simulation of motion picture film.

2. Description of the Prior Art

Television broadcasts generally can be thought of as providing two distinctly different "looks." Viewers of television broadcasts can commonly discern a difference between the look of a broadcast from a video camera and the look of the broadcast from motion picture film. For example, the news, game shows and afternoon soap operas are typically shot on video cameras whose signals are recorded on videotape. In contrast, broadcasts of programming that originated on motion picture film are often thought of as presenting a different and richer "look" than that of a video camera broadcast.

Motion picture film is commonly transferred to videotape for editing and broadcast purposes. However, even under such circumstances the motion picture film retains the unique richer film "look." This richer look is associated with the higher quality, more expensive production process of motion picture as compared to the look of a broadcast recorded from a video camera.

Production of works that originate on motion picture film typically costs three to five times as much as does the production of a video originated work. In addition, motion picture production often requires crew positions and film equipment that is much more expensive than broadcast video equipment.

The visually perceivable difference between the look of a broadcast made on a conventional video camera and the look of a broadcast made from motion picture film that has been transferred or converted to a video signal, can be important to the nature of the work being created and the medium in which it is intended to be broadcast, as well as the market it is trying to reach. This difference in appearance between these two methodologies is attributable in part to the differences between the way in which a conventional video camera captures and displays images as compared to the way in which a motion picture camera does the same.

A first difference between a video camera broadcast and a broadcast of motion picture film transferred or converted to a video signal is related to the way in which the video camera captures or freezes time as compared to how the motion picture camera captures or freezes time. A second difference in the broadcast outputs between these two methodologies is related to the contribution of film emulsion grain to the visual appearance of a motion picture film.

A conventional video camera captures action as a series of horizontal electronic scans of a photosensitive pick-up tube or a solid state, charged coupled device (CCD) type image sensor. The action in front of the lens of the video camera is output as a series of interlaced fields, or half frames. Two video fields are required to make up one complete video frame. The first video field consists of the odd numbered scan lines, while the second video field consists of the even numbered scan lines.

In the United States and other countries that use 60 Hz power, a broadcast field rate is approximately 60 fields per second, which yields a frame rate of about 30 frames per second.

A motion picture camera captures action as a series of still photographs by opening and closing the camera shutter at a predetermined rate. When viewed in rapid succession, these still images create the illusion of motion. In the United States and most other countries that have 60 Hz power, the standard camera and film projection speed is 24 frames per second. Those countries that have 50 Hz power use 25 frames per second as their standard film projection speed.

In order to view motion picture film on a conventional National Television Standards Committee (NTSC) video system, the film's 24 images per second must be converted to 60 video fields (or 30 video frames) per second. This film-to-video conversion process requires that 6 additional video frames be created each second from the 24 images per second motion picture film. Conventionally, these 6 extra video frames per second are created by scanning every other film image for three fields rather than two fields. This process of converting 24 images per second to 30 video frames per second is called "3-2 conversion." This process is well known in the broadcast industry as the methodology for converting motion picture film to video for broadcast.

With a conventional video camera, one second of time produces 60 independent video fields. By dividing each second into 60 separate video fields, the conventional video camera yields a smooth continuity of motion when broadcast.

For those countries and locations that do not use NTSC television systems, such as the United Kingdom and much of Europe, the 3-2 conversion process is not used. This is so because the motion picture film in these countries is photographed and projected at 25 frames per second, where each frame of film yields two video fields or one complete video frame. Occasionally, film for television broadcast is photographed at an increased rate of image capture of 30 frames per second. When this is done, the need for the 3-2 conversion for transferring the film to video is eliminated.

The 3-2 film-to-video conversion process creates a video sequence whereby motion within the scenes of the original motion picture film is displayed discontinuously. The viewer of such a broadcast may notice a "stepping" or "skipping" action to rapid motion within the scenes of the original film. In contrast, because of the way in which video cameras capture images, this stepping or skipping is largely undetected.

As noted above, the second major factor that contributes the look of motion picture film is the film media itself. The photochemistry of the light sensitive film emulsion that coats the film results in a granular image. The grain on film media appears as random patterns of similarly sized particles, localized into areas of similar exposure and density. The localized random patterns of particles creates a microscopic mosaic that produces a visual "texture" that is associated with the look of motion picture film.

Since each film image is photographed on and developed from a different piece of the film stock, the precise grain particle placement is uniquely different from frame to frame although the intensity of grain tends to be similar. As a result, even the photographing of a static scene will yield a constantly changing granularity on film media. The intensity of the grain effect can vary depending upon the film stock. Film stock with a higher sensitivity to light generally exhibits more visible grain than does film which is less sensitive to light.

Electronic noise of some level is generally produced by all video cameras. Some forms of random high frequency noise can appear as a type of granularity on video systems. However, this type of granularity is not of the same degree and nature, visually, as is the granularity created by the photochemistry of motion picture film. Random electronic noise has no spatial dependence and is generally only one scan line high.

The visual differences between broadcasts of works originally created on video cameras as compared to those created using motion picture film and motion picture cameras are well known to those skilled in the art. The principal causes of these differences as described above are used in connection with the present invention to help provide a video camera for real time simulation of the visual appearance of motion picture film that has been transferred or converted to a video signal, as well as a method for effecting such simulation. The desirability of producing movie quality broadcasts through a video medium has been long-felt, and there have been several attempts to achieve these and other related objectives, none of which employ the unique elements and steps of the present invention.

A method and apparatus for video image film simulation is described in U.S. Pat. No. 4,935,816 to Faber, whose description is incorporated by reference herein. Faber discloses a method and apparatus for receiving a conventional video signal from a prerecorded videotape or conventional video camera and processing the signal to provide the appearance of a motion picture film recorded image to be output directly for television broadcast or recording on videotape. Faber notes that video of recorded images does not contain grain and that noise or "snow" in a video system is typically undesirable. Faber states that extensive electronic filtering is employed to eliminate noise from electronic circuits and cameras, recorders and television sets for a clear picture.

Faber identifies three basic approaches for recording moving pictures; (1) photographic film exposed using a motion picture camera which is developed and printed to projection film, which may then be shown using a projector and screen; (2) videotaping where images are recorded directly on magnetic tape from a television or video camera; and (3) video cameras and videotape used for initial recording of moving picture images, followed by the breakdown of the recorded video into red, green and blue components which is then scanned onto photographic film, which is then processed and returned to videotape using the "telecine" process. Faber indicates that each of these approaches has certain technical limitations and undesirable costs associated with them.

Faber's solution to these shortcomings is to input a video signal from a video camera or prerecorded videotape and split it to provide a first real time signal for picture information and a second real time signal for synchronization and color burst information, and a first delayed signal and a second delayed signal. Faber provides clipped filter white noise with the picture portion of the first real time signal to simulate the "grain" of film, and then forms two interrelated fields that are routed through a third delay equal in length to the first delay. By sequentially repeating the interpolation of fields to be timed with predetermined delays, when processed the resultant video output comprises five field sets wherein each of the first four fields is an interpolation of a preceding and succeeding frame pair while the fifth field is a repeat of the third interpolated field.

Commercial efforts at creating film-like video cameras include a product known as the Ikegami EC 35 and a CEI/Panavision video camera. These two commercial products were introduced in the early 1980s, and both employed a similar concept of attempting to adapt a film lens to a modified hand-held tube type color camera. The external appearance of these two commercial products was much like a film camera, but the output pictures were generally on par with a high quality video camera and were not effective in simulating the look of a motion picture camera.

None of the above-described attempts at creating a video signal that can emulate the look of motion picture film has succeeded in creating a commercial and effective product, having the attributes of the present invention which are described hereafter.

SUMMARY OF THE INVENTION

The shortcomings of the prior art may be substantially reduced or eliminated using the present invention. According to the present invention, a video camera is provided for real time simulation of the visual appearance of motion picture film that has been transferred or converted to a video signal. The video camera simulates the effect of a motion picture camera's shutter by using non-interlaced scanning of the solid state image sensors. The data from each complete image scan is stored digitally in local camera memory, and it is thereafter read from the local memory at the desired speed. The camera and method of the present invention then combine the stored video signal with a two dimensional digital grain effect generator, before being output as a conventional interlaced video signal.

A method is provided for creating the look of broadcast motion picture film wherein the method comprises the steps of increasing the scan rate of CCD image sensors and outputting non-interlaced video images, converting said video images from analog to digital form, writing said video images to memory, reading said video images from said memory to a video output data bus at predetermined rates, adding a selective adjustable amount of two dimensional electronic artifacts to simulate film grain, and converting said video images from digital to analog form for broadcast or videotape recording.

The local memory and associated control circuitry of the present invention provides a 3-2 simulation of a 24 frame per second film transfer, as well as a 1 to 1 simulation of motion picture film that was shot and transferred to video tape at 30 frames per second. The present invention further provides a video memory that has the ability to freeze a full resolution frame of video. In the present invention, since the image is stored digitally, a simulation of film grain can be added as a two dimensional, random mosaic structure before the digital video is converted to a conventional interlaced output signal. Grain effect circuitry is provided which allows for the adjustment of the size and amount of grain in order to simulate various film emulsions and effects.

It is an object of the invention to provide a video camera that can be used to create video outputs that emulate the look of motion picture film, whether in black and white or color. It is a further object of the present invention to provide a method for creating the look of a motion picture film that has been transferred to video.

It is yet another object of the present invention to provide a method that operates in a non-interlaced, sequential mode at increased scan rates, to provide adjustable electronically-generated grain to the video signal, to have a capability to write to memory in a non-interlaced increased speed mode at the same time as reading out of memory in an interlaced, conventional NTSC TV mode, to provide a switch selectable method for creating the simulated look of motion picture film, and to provide video memory circuits capable of freezing a full resolution video picture.

It is still another object of the present invention to make the camera and method operate within the PAL and SECAM standards of the United Kingdom and France, respectively, as well as to make the camera and method claimed herein operative in conjunction with high definition television (HDTV).

It is still a further object of the present invention to reduce production costs in generating video output signals that provide motion picture quality looks, and to reduce the amount of time necessary between the shooting of a scene and the creation of motion picture quality video output for editing and broadcast purposes.

These and other objects of the present invention will be more fully understood by reference to the drawings and detailed description of the invention set forth herein.

BRIEF DESCRIPTION OF THE DRAWINGS

FIG. 11 are tables describing the present devices memory buffer read and write cycles when simulating film that was shot at 30 frames per second and at 24 frames per second.

DETAILED DESCRIPTION

Figure 1:
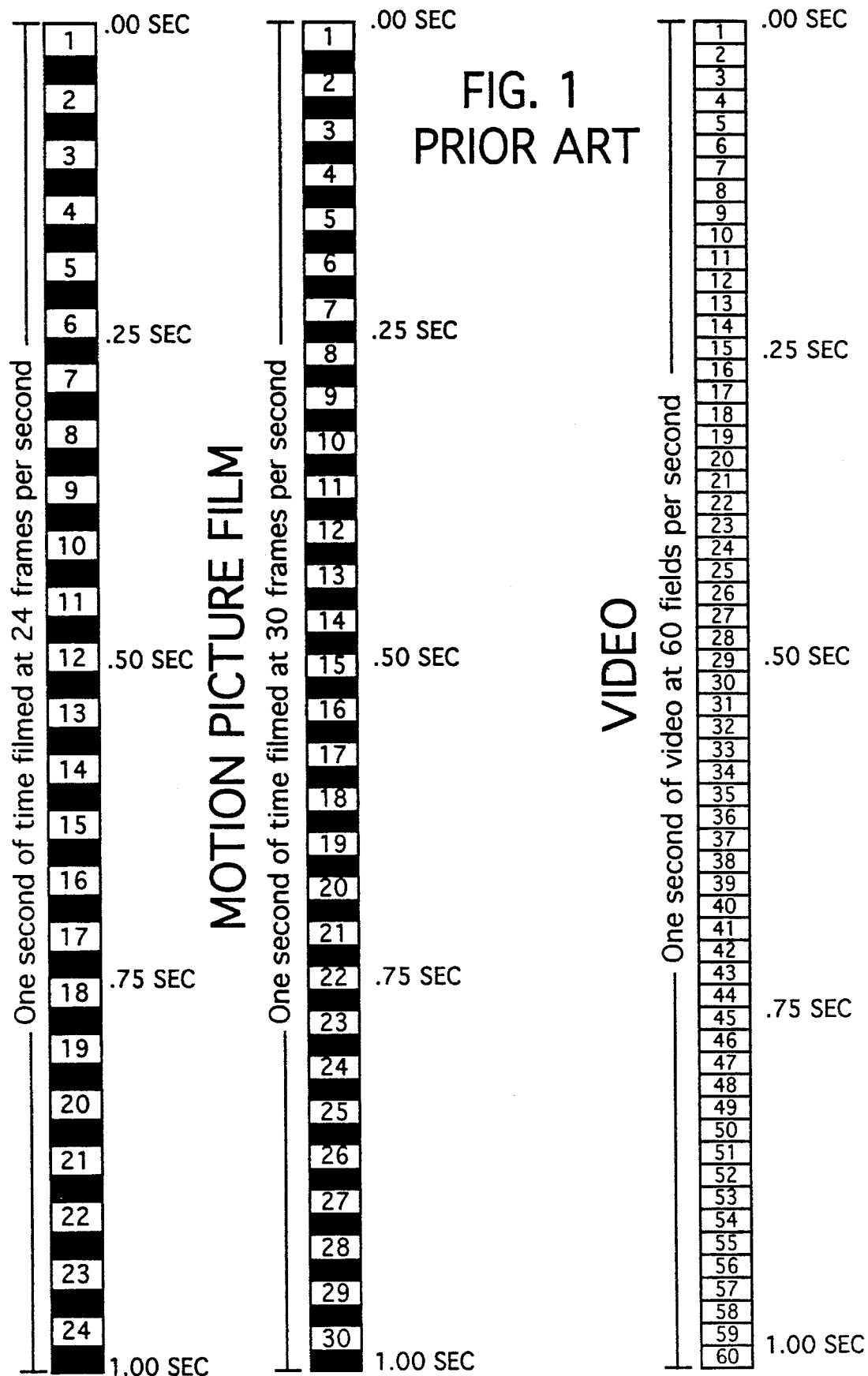
FIG. 1 illustrates a comparison of how time is captured at two different speeds on motion picture film and on a prior art video camera.

The camera and method of the present invention use a non-interlaced image sensor to capture full frames of video at an increased scan rate to simulate the exposure duration of a motion picture camera shutter. Thereafter, the present invention converts said non-interlaced video images from analog to digital data. The present invention then separates the odd and even numbered scan lines of said data and writes this data into two of three memory banks. Thereafter, the present invention reads the memory banks in a predetermined order. Digital artifacts, simulating film grain are then combined with the image data. The resultant data is then converted to a standard interlaced video signal.

The description that follows refers to a NTSC TV system. If this present invention were to operate within PAL, SECAM or the various HDTV systems that are employed or in development around the world, the speeds, frequencies, number of horizontal lines, number of pixels per line, memory requirements and frame rates would be modified to accommodate proper synchronization and operation within the appropriate TV system.

This detailed description relates to the present invention's operation within a black and white, NTSC video system. In a color system, this invention operates on the video signal(s) prior to the color encoding process. Hence, it will be apparent to one skilled in the art that most of the described circuitry would be duplicated three times to accommodate the separate red, green and blue video signals. In a color system, all the control and clock signals would be synchronous in timing and phase between the red, green and blue video signals and data paths.

The input format of the video signal that enters the present invention requires that it be digitized and stored very quickly. The output format of the stored video data requires a slower conversion. The inherent characteristics of this present invention necessitates different input and output data rates.

The high speed requirements of the input stage of the present invention make it more feasible to do as much of the data alterations at the slower output stage of the present invention. This is made clear by considering the following volume and rates of data that pass through the present invention.

In NTSC color or black and white versions, the input signal enters the present invention as a non-interlaced video frame. A complete black and white video frame is digitized and stored into memory in less than 16.7 ms. Each frame contains 525 horizontal scan lines, each consisting of 756 pixels. A total of 395,850 samples of data must be digitized and stored within each 16.7 ms digitizing period. The digitization rate for sampling the non-interlaced input video is set at 28.63636 MHz. This digitization rate is derived by multiplying the frequency of the NTSC color subcarrier by eight.

To achieve NTSC standards, the original non-interlaced signal must ultimately be output by the present invention as two interlaced fields. The first field of each frame consists of the odd numbered horizontal scan lines. The second field consists of the even numbered horizontal scan lines. Each of these two fields contains approximately 197,925 samples of the original digitized frame. However, of the 525 original horizontal lines that makeup the frame, approximately 486 horizontal lines are the active picture area. The remaining lines in an NTSC system are used for synchronization purposes.

By storing only the active picture area, the storage requirements of the present invention are reduced from 262 horizontal lines to 243 horizontal lines per field. Each line of a field is addressed by an 8 bit digital address. Each pixel within each line is addressed with a 10 bit digital address. Each field of active picture area can be stored in a 256K by 10 bit memory device. Non-NTSC and High Definition versions of the present invention will require more memory per field.

The preferred embodiment of the present invention comprises an imaging element, an analog conditioning circuit, an analog-to-digital converter, a memory circuit, a post-conditioning circuit, a digital-to-analog converter, and a timing and control circuit.

The method of the present invention creates video outputs that emulate the look of motion picture film where an image is captured and converted to a non-interlaced analog signal which comprises the steps of converting the analog signal to a digital representation, separating the digital representation into odd and even numbered scan lines and storing the separated digital representation in a plurality of memory banks, retrieving the separated digital representations from the plurality of memory banks in a predetermined manner, adding grain to the digital representations, and converting the digital representation to an interlaced analog signal.

The present invention is not limited to any particular input or output standard, including but not limited to NTSC, SECAM, PAL, PAL-M and evolving HDTV (High Definition Television) standards.

FIG. 1 shows how images are captured or recorded by a motion picture film camera and with a conventional, prior art video camera during a one second interval of time.

Figure 2:
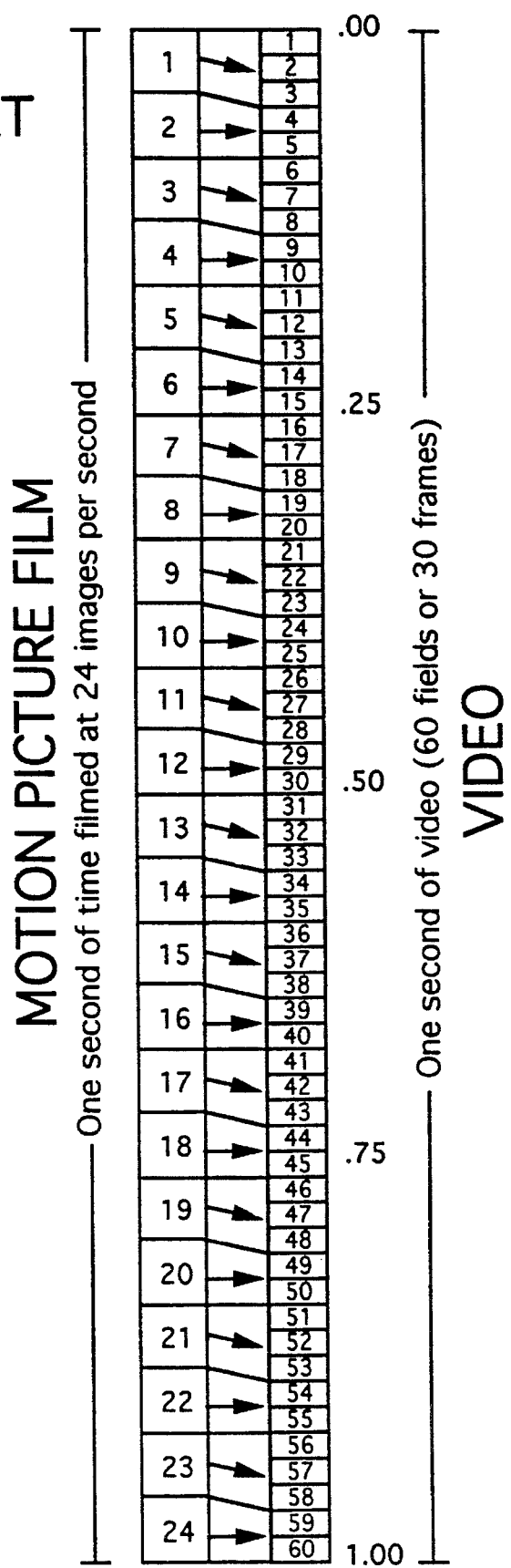
FIG. 2 illustrates how motion picture film shot at 24 frames per second is transferred to 30 frames per second video tape, also known as 3-2 transfer.

FIG. 2 shows how film shot at 24 images per second is transferred to 60 video fields per second with the prior art methodology, known as 3-2 conversion. Specifically, in the NTSC color television standards, there are actually 59.94 video fields per second, or 29.97 video frames per second which are rounded off to 60 and 30, respectively.

Figure 3:
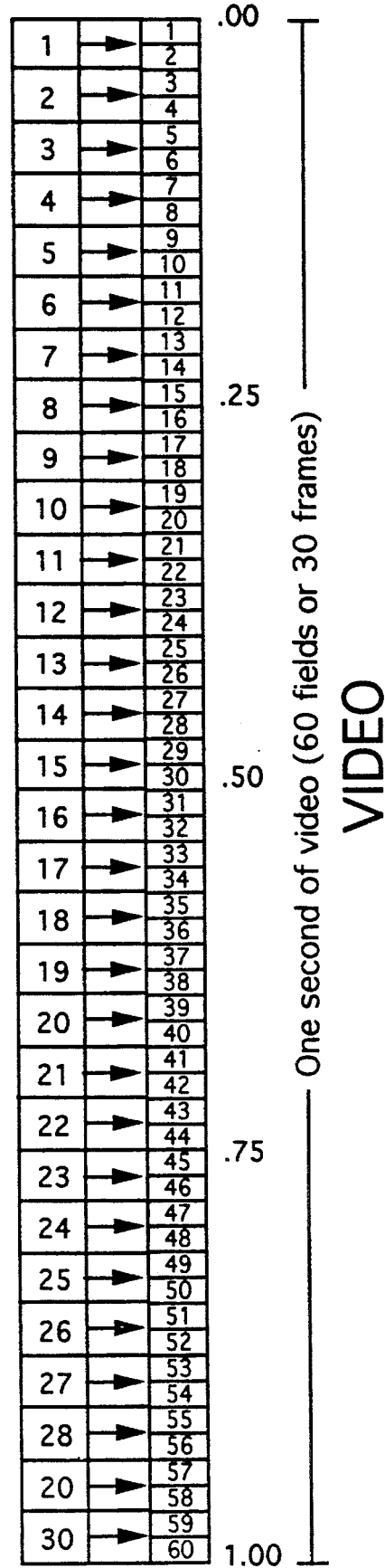
FIG. 3 illustrates how motion picture film shot at 30 frames per second is transferred to 30 frames per second video tape, also known as a 1 to 1 transfer.

FIG. 3 shows a similar conversion process, where the film is shot at the increased rate of 30 images per second. Since the 30 images per second of film is transferred to 30 frames of video (60 fields), the transfer is referred to as one-to-one since each film image yields one complete video frame. This, too, is known in the prior art.

Figure 4:
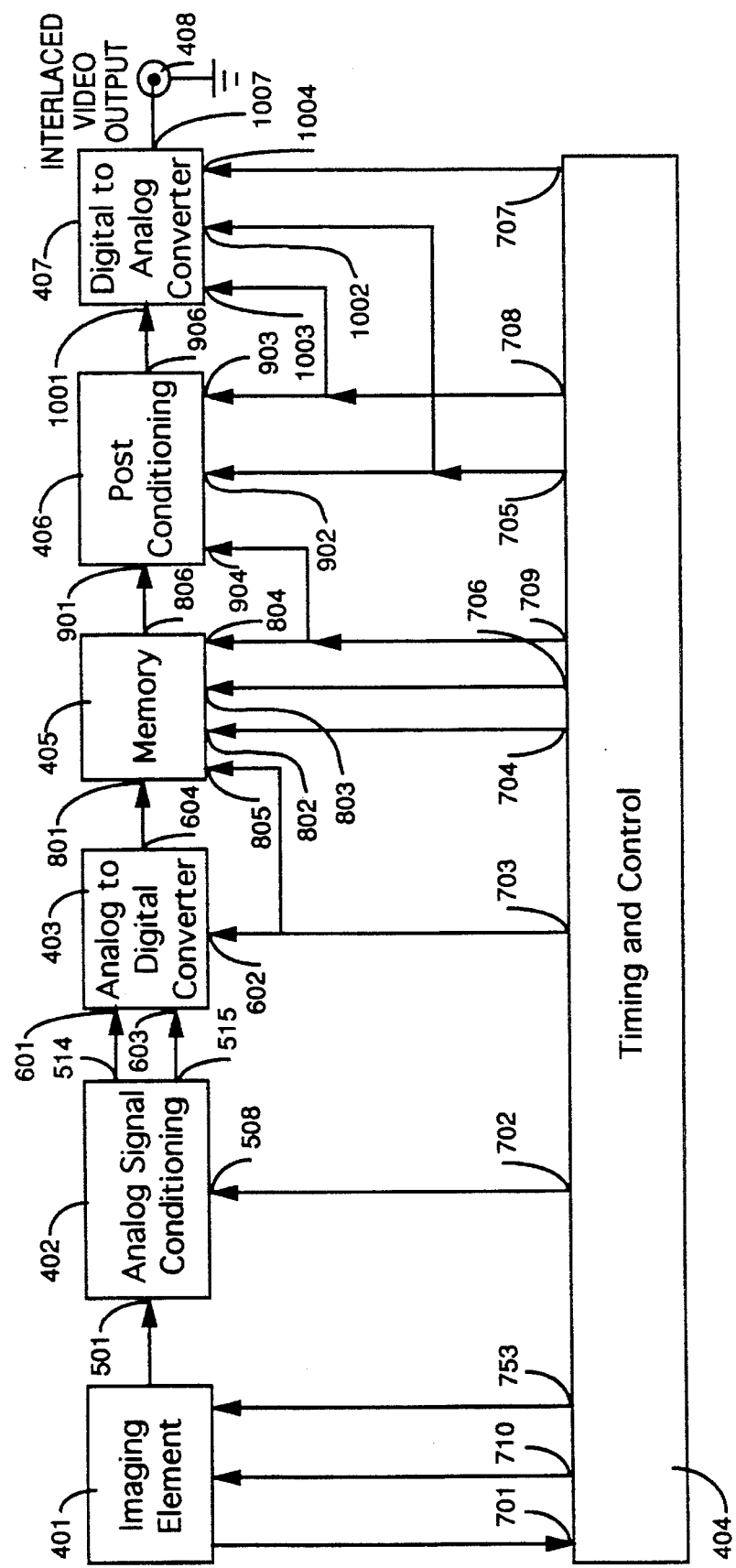
FIG. 4 illustrates a block flow diagram showing the overall elements and steps of the present invention, including their inter-relationship.

FIG. 4 shows an overview of the elements of the present invention. The interrelationship of these elements is discussed in succeeding paragraphs. A conventional imaging element 401 is shown which provides 60 frames per second of non-interlaced video. Signal 501 is a non-interlaced, 60 frames per second, 1 volt video signal. Signal 701 is composite blanking from the imaging element to indicate blanking intervals between horizontal and vertical traces. Signal 710 is the imaging element horizontal drive signal. Signal 753 is the vertical drive signal.

Analog signal conditioning circuit 402 is shown, as is analog to digital converter 403 ("ADC"). Timing and control circuit 404 is provided, as is memory circuit 405. Postconditioning circuit 406 is shown, as is the digital-to-analog converter 407. Finally, interlaced video output 408 is shown, which the video output connection provides the standard 30 interlaced video frames per second output.

The step of converting an analog signal to digital representation is accomplished through the use of the conditioning circuit and the use of the ADC, as described with reference to FIGS. 5 and 6.

Figure 5:
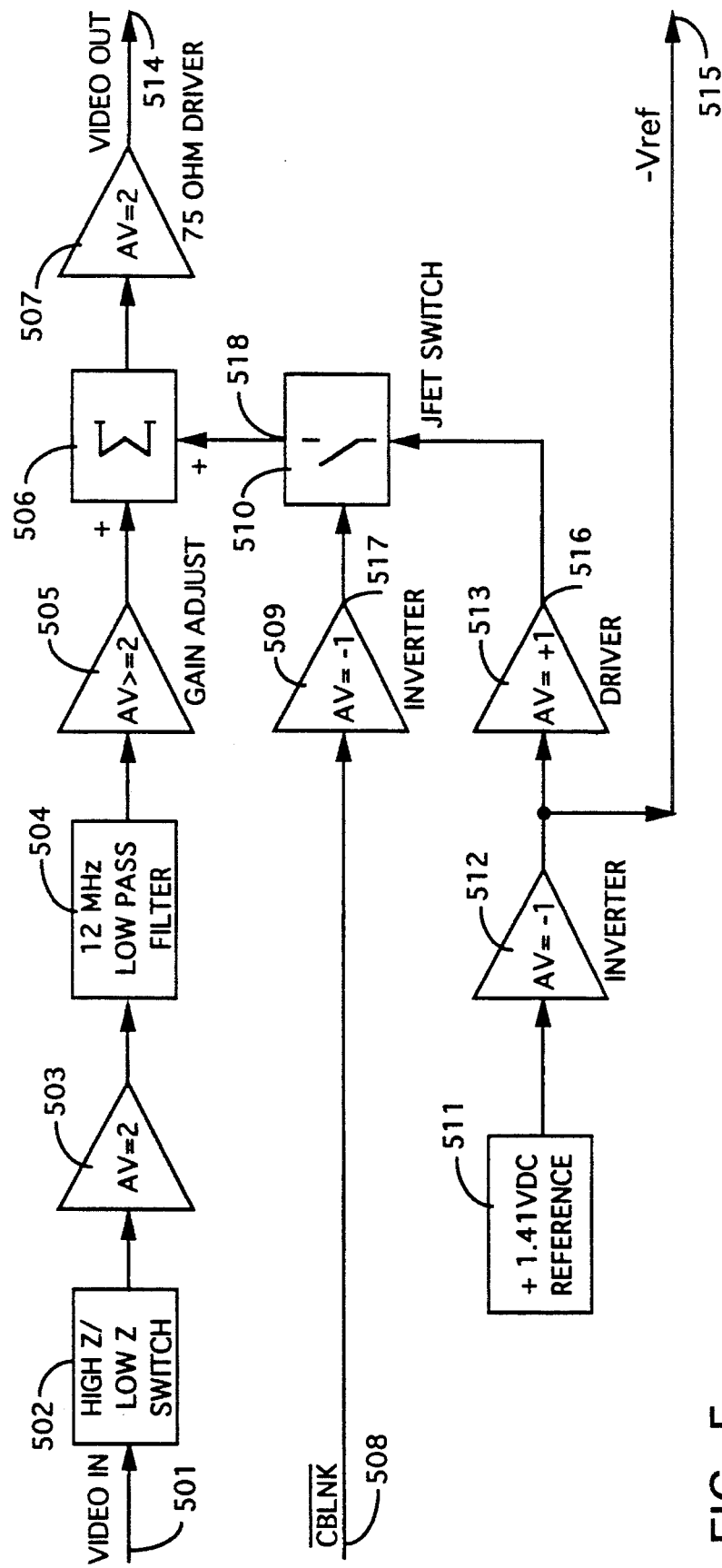
FIG. 5 illustrates a block flow diagram of an analog signal input conditioning circuit.

FIG. 5 shows a block diagram of the analog signal conditioning circuit (corresponding to FIG. 4, circuit 402) used to prepare the non-interlaced, input video for analog to digital conversion. The signal conditioning functions include a DC restoration/video buffer that clamps the input analog video signal so that picture blanking equals 0 converter units.

The signal conditioning circuitry will also amplify the clamped video signal so as to utilize the complete dynamic range of the selected analog to digital converter and to compensate for the inherent loss of the low pass filter. The gain is dependent on the specific requirements of the selected analog to digital converter and the selected low pass filter.

The present invention's signal conditioning circuitry includes a 12 MHz low pass, anti-aliasing filter 504 to prevent signals above the Nyquist frequency of 14.32 MHz from appearing as undesired artifacts in the digitized signal.

In FIG. 5, a video signal 501 from a 60 frame-per-second, non-interlaced video source, such as a video imaging camera, is input to a high impedance/low impedance switch 502 for impedance matching. The output is passed to a video amplifier 503 which provides a gain of 2. The resultant signal is input to a 12 Mhz low pass filter 504 which limits the signal to less than the Nyquist frequency of one half the required digital conversion rate. The filtered signal output from low pass filter 504 is input to another amplifier 505 which compensates for the loss caused by the low pass filter. Signal 508 CBLANK is composite video blanking provided by the timing control circuit 404 (see FIG. 7, output 702). Signal 508 is input to amplifier 509 which inverts the signal to match the JFET switch 510. A 1.41 DC voltage reference signal 511 is provided. Signal 511 is inverted by inverter 512. The signal from inverter 512 is input to a driver amplifier 513 and also output as signal 515. Amplifier 513 is used to drive the JFET switch 510. The JFET switch 510 uses signal 517 to make and break the connection between signals 516 and 518. The output of amplifier 505, after having been restored to the necessary level, and signal 518 are input to a resistor network summation circuit 506 to clamp the blanking portion of video signal 501 to the reference voltage. The output of circuit 506 is input to amplifier 507, a 75 ohm driver with a gain of 2. Driver amplifier 507 outputs signal 514, a conditioned video signal, for subsequent analog to digital conversion.

Figure 6:
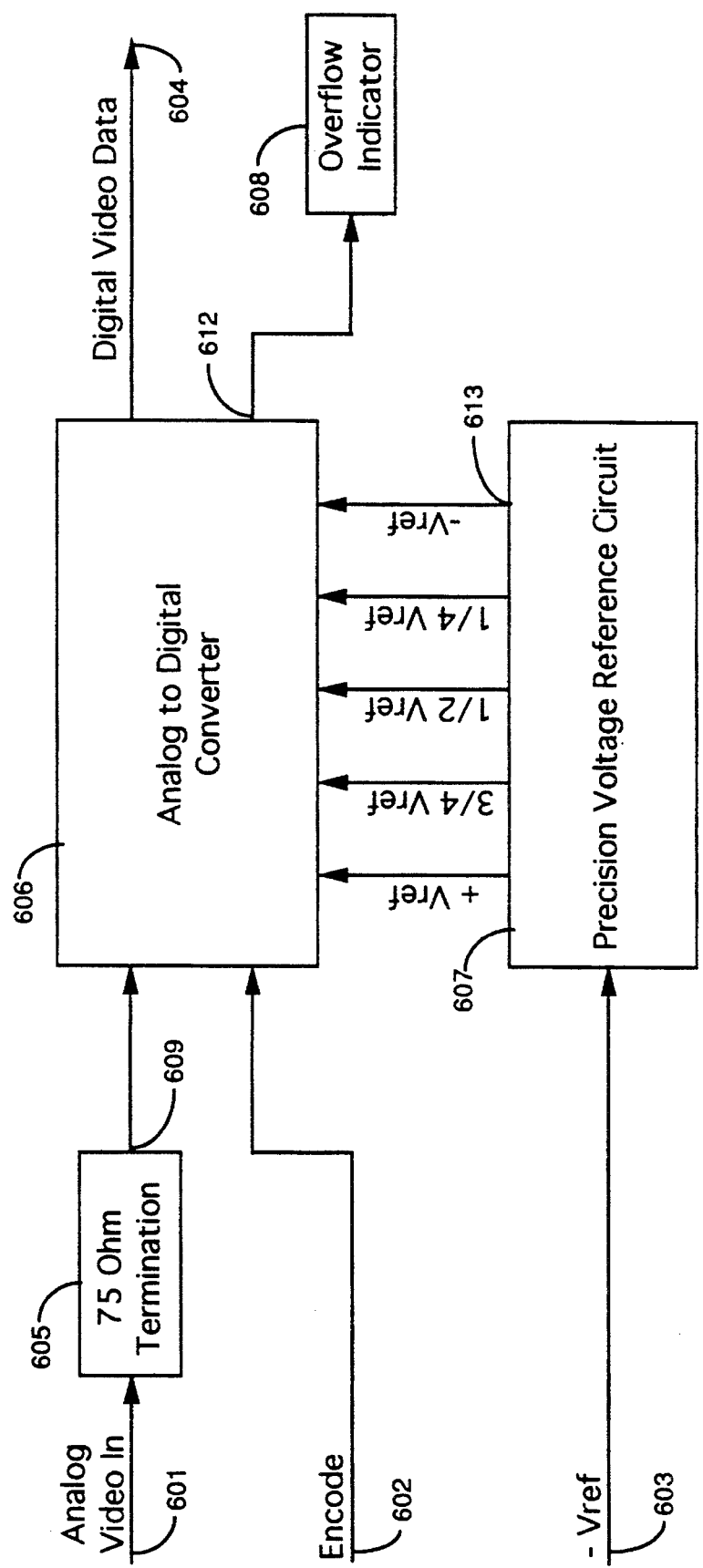
FIG. 6 illustrates a block flow diagram of an analog to digital converter circuit.

FIG. 6 shows a block diagram of the analog to digital converter circuit used to convert the conditioned non-interlaced input video to digital format. It utilizes a 10 bit, high speed, bipolar analog to digital converter 606 (ADC). The selected conversion rate for a NTSC system is 28.6363 MHz. This sampling frequency was selected to be 8 times the frequency of the color subcarrier used in NTSC television standards (3.57954 Mhz). While it is known in the art to digitize video at 4 times the frequency of the color subcarrier, the present invention utilizes a multiplier of 8 because the present invention operates in a non-standard mode which inputs video to the ADC circuitry at 60 complete frames per second as opposed to the standard NTSC rate of 30 frames per second.

The present invention employs a 10 bit analog-to-digital and digital-to-analog data path. 10 bits yields up to 1024 steps from black to white. It would be possible to construct the present invention with an 8 bit data path, however this would yield a maximum of only 256 steps from black to white.

The ADC pixel clock is locked to horizontal sync. The ADC will not convert during the vertical sync, horizontal sync and blanking interval of the non-interlaced input video signal. The ADC's conversion is controlled by timing and control circuit 404, shown in greater detail in FIG. 7.

As shown in FIG. 6, conditioned video signal 601 (corresponding to signal 514 in FIG. 5) is input to a 75 ohm termination resistor 605. Input 603 is the negative voltage reference (corresponding to signal 515 in FIG. 5) and is passed to a precision voltage reference circuit 607 which generates reference points output as signal set 613. Terminated signal 609 is the input analog signal to analog to digital converter 606 ("ADC"). Signal 602 (corresponding to signal 703 in FIG. 7) provides ADC 606 convert pulses. ADC 606 takes the analog input signal 609 and uses the encode signal 602 and voltage reference signal set 613 to generate digital video data 604 and overflow signal 612. The overflow indicator 608 provides the operator an indicator for setting the white level by adjusting the gain of amplifier 505 in FIG. 5.

Figure 7:
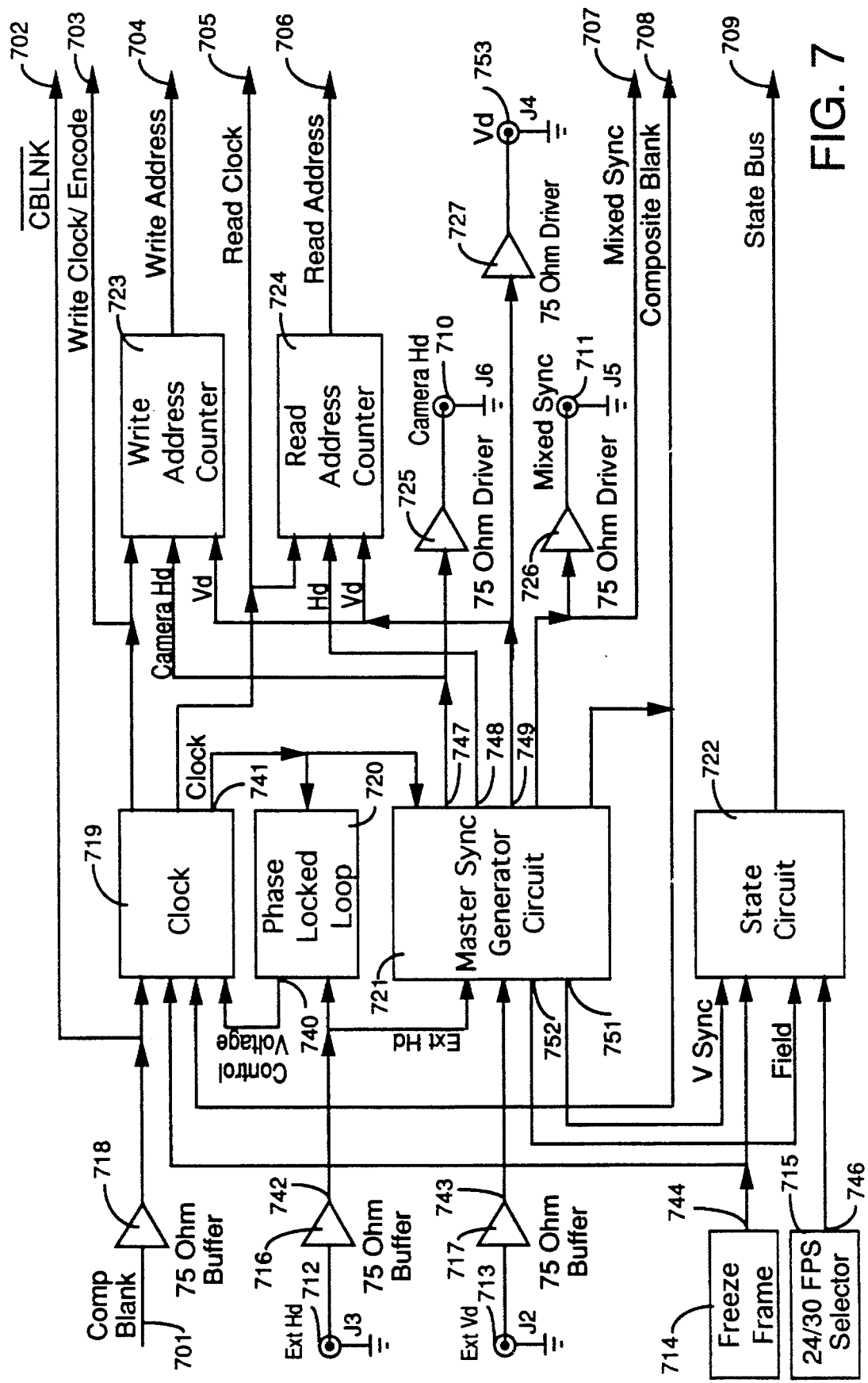
FIG. 7 illustrates a block flow diagram of a timing and control circuit.

FIG. 7 shows the timing and control circuit 404, which controls the present invention's timing from input to output. This includes a master clock 719. Timing control signals are derived from master clock 719 and mode select input switches described hereafter. The timing and control circuit is described generally hereafter, with detailed reference to FIG. 7 provided after said general description.

Master clock 719 and the horizontal sync of the video signal are phased locked. This insures that pixels from each scan line of video are vertically aligned, eliminating horizontal jitter within the video frame. To insure proper phase locking, horizontal sync is derived from master clock 719.

Timing and control circuit 404 can have two user selected digital inputs. The inputs are a "freeze frame" selector signal and "24/30" images per second selector signal.

Operator selection of the freeze frame mode causes the next occurring video frame to be held in memory and displayed until the "freeze frame" mode is changed.

Figure 8:
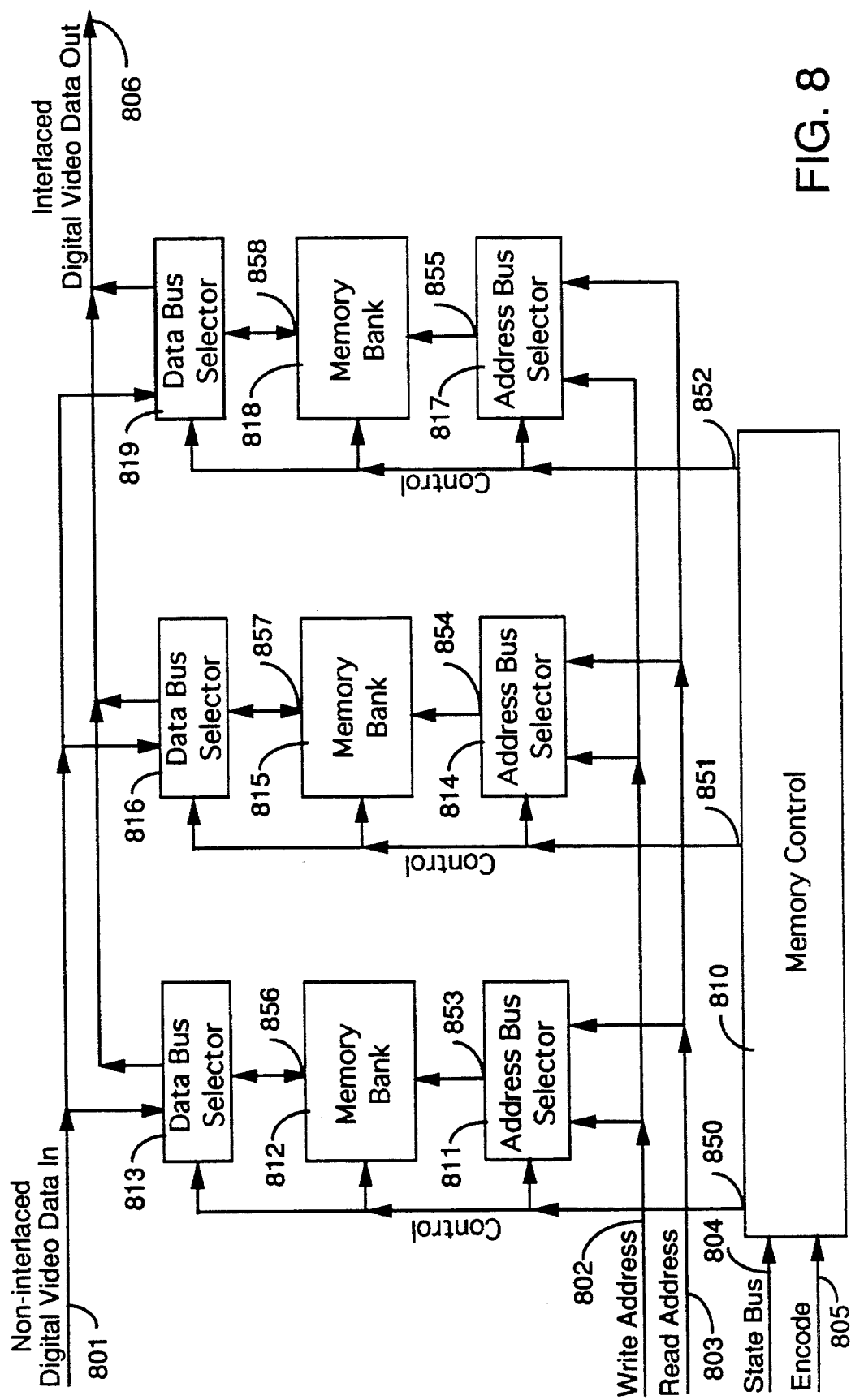
FIG. 8 illustrates a block flow diagram of an address multiplexer and memory control circuit, including three high speed field memory banks.

The "24/30" mode selector switch 715 determines the order that the video input data bus is written to the three field memory banks (856, 857 and 858 of FIG. 8) and read from these memory banks to the video output data bus. The memory read and write operations are simultaneous. Data on the video input data bus is written to two of the banks of memory while it is being read to the video output bus from the third bank of memory. These three, high-speed video memory banks are shown in FIG. 8.

Operator selection of the "30" mode causes the present invention to output an interlaced frame of video that is derived from every other non-interlaced frame from the CCD imaging device. The "30" mode simulates the "look" of motion as captured on a conventional motion picture film camera operating at 30 frames per second (see FIG. 3).

The timing and control signals for the "30" mode sequence the input and output of the three field memory banks as a circular buffer. For any given image, one of the three field memory banks will be used to store the odd numbered horizontal scan lines. One of the two remaining field memory banks will be used to store the even numbered horizontal lines that make up a complete frame of video. An effort has been made to sequence the three memory banks so that the number of reads and writes to each of the three memory banks is balanced. This technique best distributes power dissipation among the memory banks.

Table 1 of FIG. 11 details the memory timing scheme for operation in the "30" mode. This timing scheme repeats on the 7th field.

Although the third memory bank is necessary only for the "24" mode, it is utilized in the "30" mode to evenly distribute heat dissipation of the memory circuitry.

Operator selection of the "24" mode causes the present invention to simulate the 3-2 conversion (see FIG. 2) required to transfer motion picture film, shot at 24 frames per second, to video. The memory read and write method as described above in the "30" mode is utilized in the "24" mode, but the sequence of the reads and writes is altered.

In the "24" mode, during the output of every other video frame, one of the field memory banks is read twice. It is important that the order of even and odd fields of video be preserved to prevent vertical jitter and maintain full vertical resolution. The 24 fps memory timing scheme repeats itself on the 11th frame. Table 2 of FIG. 11 details the memory timing scheme for operation in the "24" mode.

In a color video system the timing control signals would be common to all three (red, green and blue) video channels. This provides precise synchronization between the three parallel video channels.

As shown in FIG. 7., input signal 701 (see also FIG. 4) composite blanking from the non-interlaced video source is converted to a digital signal by a 75 ohm buffer 718. The output of buffer 718 is the video source composite blanking signal or CBLNK signal 702. Input signal 712 is the external horizontal drive. Signal 712 is converted to a digital logic level signal 742 by the 75 ohm buffer 716. Input signal 713 is external vertical drive. Signal 713 is converted to a digital logic level signal 743 by the 75 ohm buffer 717. Operator interface 714 controls freeze frame control logic signal 744.

Operator interface 715 provides the operator a choice between 24 and 30 frames per second film simulation modes, through 24/30 frame selector logic signal 746. The overall system is controlled by master clock 719. The frequency of the master clock is variable and controlled by signal 740. Signal 740 is generated by phase locked loop 720. Phase locked loop 720 generates control voltage as a phase comparison of clock signal 741 and horizontal drive signal 742. Master clock 719 also generates a write clock signal 703 by logically "ANDing" clock signal 741 with video source composite blanking signal 702 and also logically ANDing the signal 744 from operator interface 714. Read clock signal 705 is one half the internal clock frequency. It is derived by dividing signal 742 by 2 and logically ANDing the result with composite blanking signal 708. Master sync generator circuit 721 combines horizontal drive signal 742, signal 743, and clock signal 741 to generate interlaced video horizontal drive 748, system vertical drive 749, interlaced video mixed sync 707, interlaced video composite blanking 708, vertical sync 751, field indicator 752, and camera horizontal drive 747. The signal of camera horizontal drive 747 is twice the frequency of horizontal drive 748 because of the 60 frame per second frame rate of the video source.

State circuit 722 uses the vertical sync 751 control logic and field indicator 752. State circuit 722 also uses freeze frame control logic signal 744 and the 24/30 frame selector signal 746 to generate state bus signal 709 to control memory sequence based on the tables shown in FIG. 11.

Signal 746 controls which state table to use. Signal 752 is used to synchronize the start of the state sequence, as it is compared to the field bit (read even or odd) which is encoded in the state sequence to insure the correct field is being read. Signal 744 stops and starts the sequencing. Signal 751 controls the timing of the sequencing. State circuit 722 sets state bus 709 during the vertical blanking interval. Because state selection occurs during horizontal intervals, this slow rate allows a microprocessor, for example, to be used for the state circuit.

Write address counter 723 combines write clock signal 703, camera horizontal drive 747, and system vertical drive 749 to generate a write address 704. Write address 704 consists of 10 pixel address bits per line, a bit to specify odd or even fields, and 8 bits to address the line number. Consequently, write address counter 723 is a 19 bit counter. Each write clock signal 703 increments the lower 10 bit section of write address counter 723. Every camera horizontal drive pulse 747 clears the lower 10 bit section of write address counter 723 and increments the upper 9 bits of write address counter 723. System vertical drive 749 clears both sections of write address counter 723, all 19 bits.

Read address counter 724 combines read clock 705, interlaced horizontal drive 748, and system vertical drive 749 to generate a read address 706. Read address 706 consists of 10 pixel address bits per line and 8 bits to address the line number. Consequently, read address counter 724 is an 18 bit counter. Each read clock pulse signal 705 increments the lower 10 bit section of the read address counter 724. Every interlaced horizontal drive pulse 748 clears the lower 10 bit section of read address counter 724 and increments the upper 8 bits of read address counter 724. System vertical drive 749 clears both sections of the counter, all 18 bits. A 75 ohm driver 725 amplifies camera horizontal drive signal 747 and outputs signal 710. Driver 726 amplifies mixed sync signal 707 and outputs signal 711. Driver 727 amplifies vertical drive signal 749 and outputs signal 753.

FIG. 8 shows three banks of random access memory to store the digitized video data. This memory is necessary to convert the non-interlaced incoming video image into an interlaced output signal with the selected effective framing rate (24 fps, 30 fps or freeze frame). In FIG. 8, the memory sub-systems of the present invention include the address multiplexer and memory control circuitry. These circuits direct which of the three high speed field memory banks will save the incoming data from analog to digital converter 403. This circuitry directs which of these field memory banks will be output to digital to analog converter 407. Also, the address multiplexer and memory control circuitry directs the read and the write memory addresses to the proper memory bank.

The present invention's high speed field memory banks consist of three identical banks of memory that are each used to store one field of video data. Based on the speed requirements for the present invention, the memory write cycle must be less than 35 nsec. The minimum size requirements for a 10 bit, NTSC system is 256K ×10 bits per field memory bank. A total of three field memory banks are used in a black and white camera. A color version of the present invention employs nine field memory banks.

In FIG. 8, bus 804 contains the state bus data (corresponding to bus 709 in FIG. 7). Input signal 805 is write clock/encode (corresponding to bus 703 in FIG. 7). Bus 804 and input signal 805 are used by memory control 810 to generate signals for memory control. Control buses 850, 851, 852 determine whether a memory bank is read enabled, write enabled, or disabled and provides the rate clock. Address bus selectors 811, 814, and 817, one for each memory bank, are used to select either write address bus 802 or read address bus 803 and generate addresses for address buses 853, 854, and 855, again one for each memory bank. Memory banks 812, 815, and 818 provide 10 bit, high speed digital memory, and use control buses 850, 851, and 852 and address buses 853, 854 and 855 to store and retrieve digitized video data via bidirectional video data buses 856, 857, and 858. Upon memory write the data bus selectors 813, 816, and 819 use the information from control buses 850, 851, and 852 to move data either to memory from video data bus 801 (corresponding to bus 604 in FIG. 6) via bidirectional video data buses 856, 857, and 858 to memory banks 812, 815, and 818. Upon memory read, the data bus selectors 813, 816 and 819 use the information from control buses 850, 851 and 852 to move data from memory banks 812, 815, and 818 via bidirectional video data buses 856, 857, and 858 to digital video data out bus 806. Otherwise, the data bus selectors 813, 816, and 819 provide no operation on memory.

These salient features of memory control 810 insure that only one bank is read and no more than one bank is written at any given time (see FIG. 11, Tables 1 and 2), disable unused memory banks, and cause digital video data to be written to memory.

The step of separating the digital representation of the video image into odd and even numbered scan lines and storing the separated digital representations in a plurality of memory banks is accomplished through the use of the timing and control circuit 404 and memory circuit 405, as described with respect to FIGS. 7 and 8, while the step of retrieving said separated digital representations from said plurality of memory banks in a predetermined manner is accomplished through these same circuits and described with respect to these same FIGS. 7 and 8. FIG. 11 describes the manner in which read and write cycles occur for simulating film shot at 30 frames per second (fps) and 24 frames per second.

Figure 9:
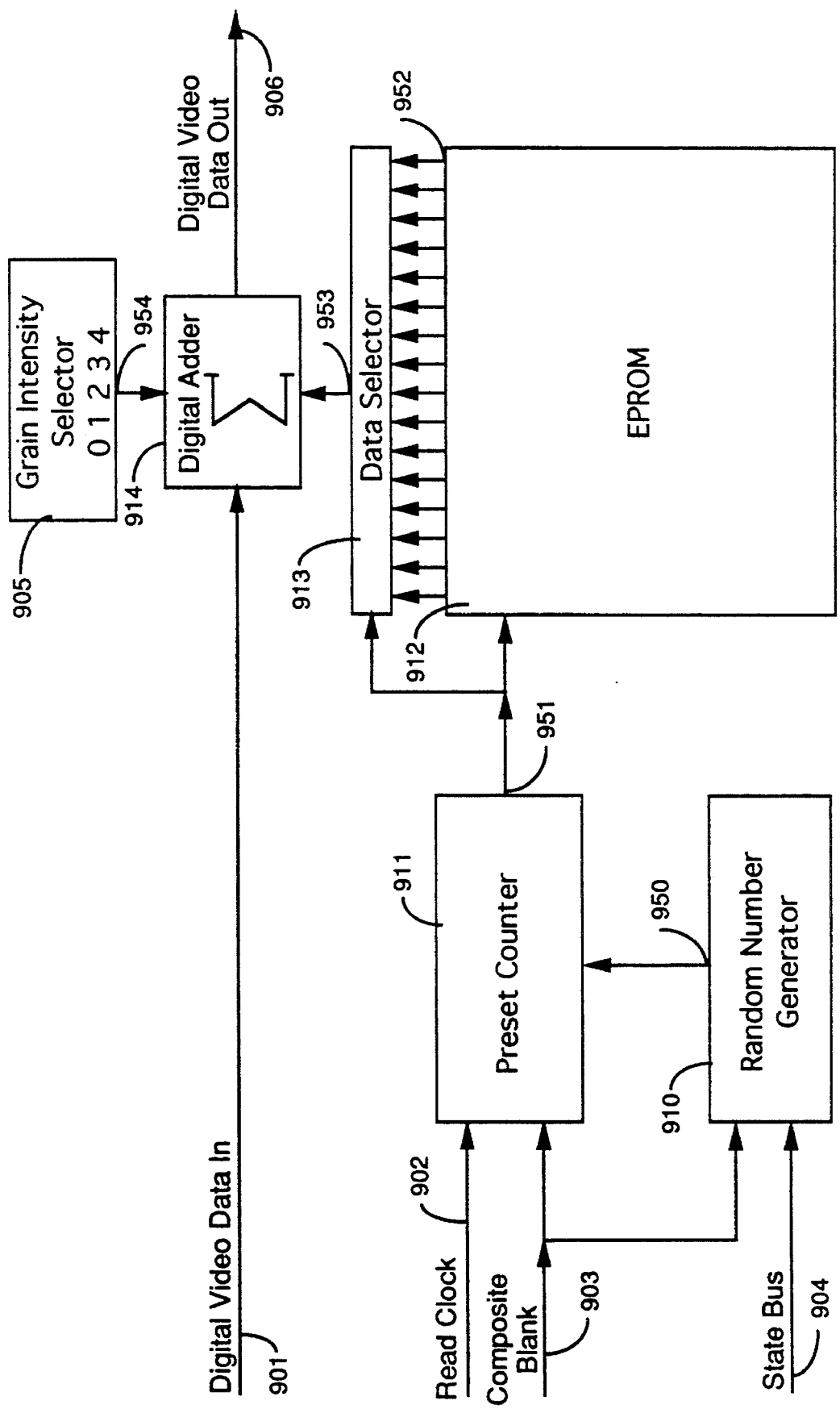
FIG. 9 illustrates a block flow diagram of a post-conditioning digital processing circuit.

FIG. 9 shows a block diagram of the present invention's post-conditioning circuit 406, for the addition of simulated film grain and other effects. The primary use of this data port is to digitally introduce simulated film grain to the video data stream.

In FIG. 9, input state bus 904 (corresponding to bus 709 in FIG. 7) and composite blanking signal 903 (corresponding to signal 708 in FIG. 7) are used by random number generator 910 to synchronize the generation and placement of a random starting address for each frame on preset address bus 950. The random number for example can be generated by a microprocessor. The number is generated between frames as determined by state bus 904 and is synchronized by composite blanking signal 903. Preset counter 911 uses read clock signal 902 (corresponding to signal 705 in FIG. 7), composite blanking signal 903 and preset address bus 950 to generate and place an address on EPROM address bus 951. The address is generated by first setting the address to the value on preset address bus 950 at composite blanking 903 and then incrementing the addresses by read clock 902 for each output pixel in the frame. An EPROM 912 is preprogrammed with data representing a very large field of two dimensional artifacts simulating film grain. The very large field is more than 3 times larger than a pixel count of an interlaced video frame. In order to get sufficient size and speed, several EPROM's can be used in parallel. The address to be read is taken from address bus 951. The data at the address specified by address bus 951 is output on the set of parallel data buses 952. The data on parallel data buses 952 are reduced to 4 bit data on digital grain bus 953 by Data Selector 913 using the lower address bits of EPROM address bus 951. The intensity of the grain is specified by grain intensity selector 905 and is output on bus 954.

Digital adder circuit 914 adds 0 to 4 bits, as determined by bus 954, of the digital grain data from bus 953 to digital video data on bus 901 (corresponding to bus 806 in FIG. 8) and outputs the result on digital video data out bus 906. The intensity of the grain is determined by the number of bits of digital grain data from bus 953 which are added. For example, the operator selects the grain intensity with a multiposition rotary switch of selector 905.

The step of adding grain to said digital representations is accomplished through the use of post-conditioning circuit 406 as described with respect to FIG. 9.

Figure 10:
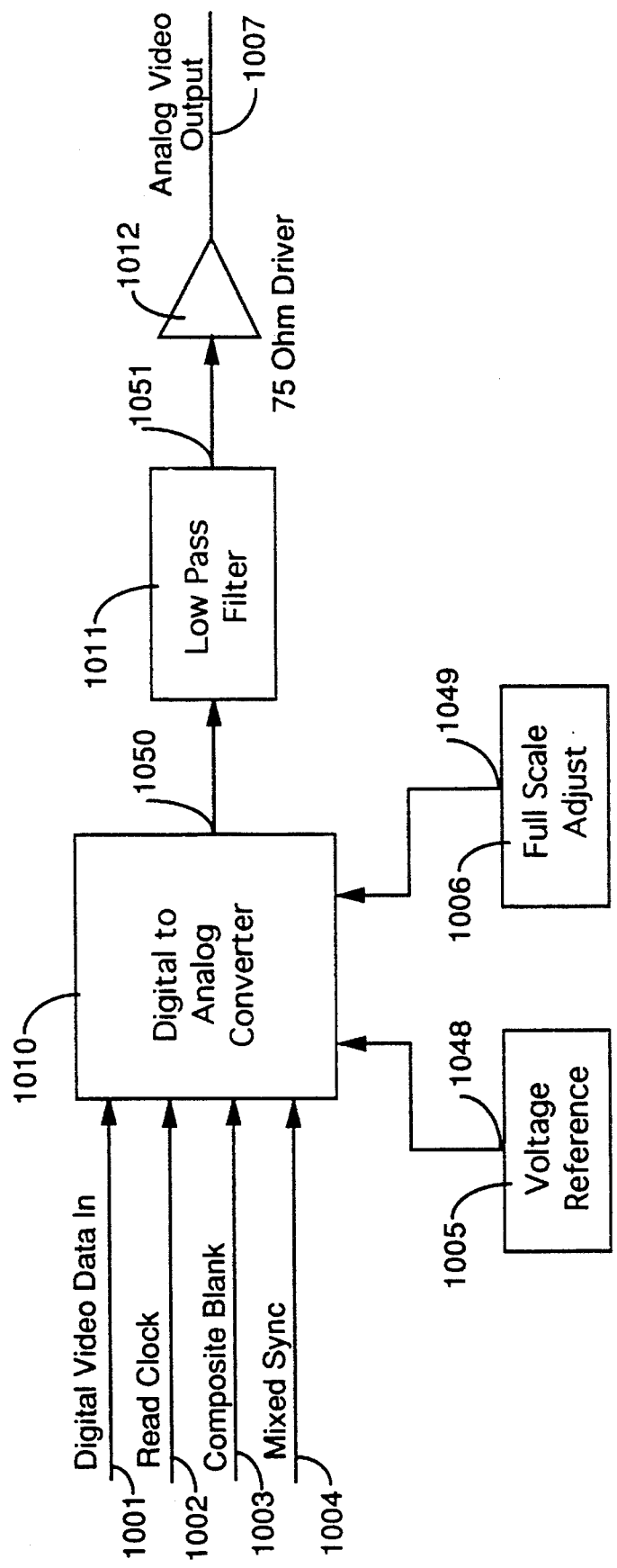
FIG. 10 illustrates a flow diagram of a digital to analog converter circuit.

FIG. 10 shows the present invention's digital to analog video converter 407 (DAC) which converts the post-conditioned video data stream from FIG. 9 to a conventional, composite, monochromatic, analog video signal.

In a black and white system, the DAC's output represents the luminescence signal. In a color system, the output of three DACs represents the individual red, green and blue video signals, prior to the color encoding process.

In FIG. 10, voltage reference 1005 generates signal 1048 to be used a reference for the specific digital to analog converter being used. Full scale adjust 1006 outputs signal 1049, which is used to adjust the white level of analog video output 1007. Digital to analog converter 1010 converts the digital video data on bus 1001 (corresponding to bus 906 in FIG. 9) to an analog video signal 1050. Digital-to-analog converter 1010 converts the data on bus 1001 when signaled by read clock 1002 (corresponding to signal 705 in FIG. 7). Voltage reference signal 1048 and full scale adjust signal 1049 are used to determine the full scale value of analog output 1050 of digital-to-analog converter 1010. Digital to analog converter 1010 inserts blanking level when signaled by composite blank 1003 (corresponding to signal 708 in FIG. 7) and inserts video synchronization pulse when signaled by mixed sync 1004 (corresponding to signal 707 in FIG. 7). Analog signal 1050 is band limited by low pass filter 1011 and output as analog video signal 1051. Analog video signal 1051 is amplified by 75 ohm driver 1012 and output as a conventional, interlaced analog video output 1007.

The step of converting said digital representation to an interlaced analog signal is accomplished through the use of digital to analog converter 407, as described with respect to FIG. 10.

Having now described the invention in detail as required by the patent statutes, those skilled in the art will recognize that modifications can be made to the embodiments described herein for specific applications. Such modifications are within the scope and spirit of the invention as defined in the following claims.

What is claimed is:

1. A video camera comprising:
   (a) a non-interlaced video signal imaging element;
   (b) an analog conditioning circuit for amplifying and bandlimiting a non-interlaced video signal generated by said non-interlaced video signal imaging element;
   (c) an analog-to-digital converter for converting said non-interlaced video signal to a digitally represented signal;
   (d) a memory circuit comprising a plurality of memory banks, for storing said digitally represented signal;
   (e) a post conditioning circuit for introducing grain to said digitally represented signal;
   (f) a digital-to-analog converter for converting said digitally represented signal to an interlaced signal; and
   (g) a timing and control circuit for synchronizing conversion of said non-interlaced video signal to said digitally represented signal and conversion of said digitally represented signal to said interlaced signal, for storing and retrieving said digitally represented signal to and from said memory circuit, and for synchronizing the addition of grain.

2. The invention of claim 1, wherein said post conditioning circuit for introducing grain to said digitally-represented signal comprises a means for adding a selective adjustable amount of two-dimensional artifacts.

3. The invention of claim 1, wherein said non-interlaced video signal imaging element comprises a double-speed scanner.

4. A method for creating video outputs that emulate the look of motion picture film, wherein an image is captured and converted to a non-interlaced analog signal, said method comprising the steps of:
   (a) converting said analog signal to digital representation;
   (b) separating said digital representation into odd and even numbered scan lines and storing said separated digital representation in a plurality of memory banks;
   (c) retrieving said separated digital representations from said plurality of memory banks in a predetermined manner;
   (d) adding grain to said digital representations; and
   (e) converting said digital representations to an interlaced analog signal.

5. The invention of claim 4, wherein said step of adding grain to said digital representations comprises synchronizing the generation and placement of a random starting address for each frame on a pre-set address bus, incrementing the addresses by employing a read clock signal for each output pixel in the frame, outputting data at the address specified by said address bus to a set of parallel data buses, reducing said data to 4-bit data, and adjusting the intensity of said grain through an intensity selector.

6. The invention of claim 4, wherein said image is captured by a double-speed scanner.

* * * * *

US005475425B1

REEXAMINATION CERTIFICATE (4125th)

United States Patent [19]
Przyborski et al.

[11] B1 5,475,425
[45] Certificate Issued Jul. 25, 2000

[54] APPARATUS AND METHOD FOR CREATING VIDEO OUTPUTS THAT EMULATE THE LOOK OF MOTION PICTURE FILM

[75] Inventors: Glenn B. Przyborski; Robert F. Gibson, both of Pittsburgh; John H. Harn, Coraopolis; Lloyd R. Hucke, III, Library, all of Pa.

[73] Assignees: Przyborski Production; Keystone Computer Resources Inc., both of Pittsburgh, Pa.

Reexamination Request:
No. 90/004,854, Nov. 26, 1997

Reexamination Certificate for:
Patent No.: 5,475,425
Issued: Dec. 12, 1995
Appl. No.: 08/186,733
Filed: Jan. 25, 1994

[51] Int. Cl.$^7$ .............................. H04N 5/262; H04N 7/01
[52] U.S. Cl. ......................... 348/239; 348/446; 382/254
[58] Field of Search .................................. 348/96, 97, 98, 348/99, 100, 101, 207, 209, 210, 239, 441, 446; 358/443, 447; 382/254, 274, 275; H04N 5/262, 7/01

[56] References Cited

U.S. PATENT DOCUMENTS

| | | | |
|---|---|---|---|
| 4,771,342 | 9/1988 | Beesley | 358/335 |
| 5,065,243 | 11/1991 | Katagiri | 258/183 |
| 5,335,013 | 8/1994 | Faber | 348/104 |
| 5,687,011 | 11/1997 | Mowry | 358/527 |

*Primary Examiner*—Wendy R. Garber

[57] ABSTRACT

Video output emulating the broadcast look of motion picture film is created by the present invention. A video camera for real time simulation of the visual appearance of motion picture film that has been transferred or converted to a video signal comprising analog signal input conditioning circuitry, an analog to digital convertor, timing and control circuitry, an address multiplexer and memory control, a digital adder, and a digital to analog convertor. A method for creating the look of broadcast motion picture film comprising the steps of increasing the scan rate of CCD image sensors to output non-interlaced video images, converting said video images from analog to digital form, writing said video images to memory, adding a selective, adjustable amount of two dimensional, electronic artifacts to simulate film grain, reading said video images from said memory banks to a video output data bus at predetermined rates, and converting said video images from digital to analog form for recording or broadcast.

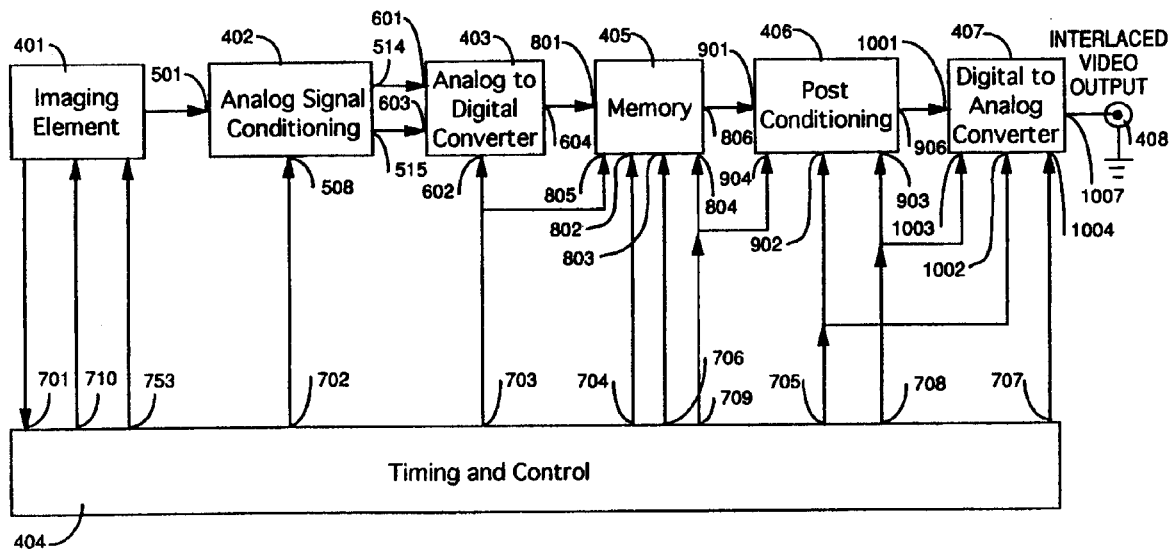

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–6 is confirmed.

* * * * *